US006022181A

United States Patent [19]

Wolterstorff et al.

[11] Patent Number: 6,022,181

[45] Date of Patent: Feb. 8, 2000

[54] PASSENGER BUS CARGO HANDLING SYSTEM

[75] Inventors: Niclas E. Wolterstorff, P.O. Box 29, Renville, Minn. 56284; Bruce E. Leonard, 6300 W. 10th St., Sioux Falls, S. Dak. 57107

[73] Assignees: Niclas E. Wolterstorff, Renville, Minn.; Bruce E. Leonard, Sioux Falls, S. Dak.

[21] Appl. No.: 08/915,947

[22] Filed: Aug. 21, 1997

[51] Int. Cl.[7] .......................... B60P 1/00

[52] U.S. Cl. .......................... 414/522; 296/37.6

[58] Field of Search .......................... 414/462, 522; 224/281, 401, 554, 564; 296/37.1, 37.6

[56] References Cited

U.S. PATENT DOCUMENTS

| | | | |
|---|---|---|---|
| 3,028,025 | 4/1962 | White | 224/564 X |
| 4,081,095 | 3/1978 | Wilburn et al. | 414/462 |
| 4,685,857 | 8/1987 | Goeser et al. | 414/522 X |
| 4,824,158 | 4/1989 | Peters et al. | 296/37.6 |
| 4,950,123 | 8/1990 | Brockhaus | 414/522 |
| 5,125,710 | 6/1992 | Gianelo | 414/522 X |
| 5,544,998 | 8/1996 | Malinowski | 414/522 |
| 5,564,767 | 10/1996 | Strepek | 296/37.6 X |

FOREIGN PATENT DOCUMENTS

| | | | |
|---|---|---|---|
| 2592344 | 7/1987 | France | 296/37.1 |

*Primary Examiner*—James W. Keenan

[57] ABSTRACT

A new Passenger Bus Cargo Handling System for offering a top loading extendable and retractactable cargo handling system. The inventive device includes a support rail, a moveable tray, axle spindles, load carrying wheels, and a retaining latch. In use, a passenger bus is equipped with the present invention and the user can more easily load cargo into the bus, saving back pain and other exasperating energies.

18 Claims, 5 Drawing Sheets

PASSENGER BUS CARGO HANDLING SYSTEM

BACKGROUND OF THE INVENTION

1. Field of the Invention

The present invention relates to touring buses luggage compartments and more particularly pertains to a new Passenger Bus Cargo Handling System for offering a top loading extendable and retractactable cargo handling system.

2. Description of the Prior Art

The use of touring buses luggage compartments is known in the prior art. More specifically, touring buses luggage compartments heretofore devised and utilized are known to consist basically of familiar, expected and obvious structural configurations, notwithstanding the myriad of designs encompassed by the crowded prior art which have been developed for the fulfillment of countless objectives and requirements.

Known prior art touring buses luggage compartments include those used by well known bus lines such as Greyhound, Jackrabbit, etc.

While these devices fulfill their respective, particular objectives and requirements, the aforementioned patents do not disclose a new Passenger Bus Cargo Handling System. The inventive device includes a support rail, a moveable tray, axle spindles, load carrying wheels, and a retaining latch.

In these respects, the Passenger Bus Cargo Handling System according to the present invention substantially departs from the conventional concepts and designs of the prior art, and in so doing provides an apparatus primarily developed for the purpose of offering a top loading extendable and retractactable cargo handling system.

SUMMARY OF THE INVENTION

In view of the foregoing disadvantages inherent in the known types of touring buses luggage compartments now present in the prior art, the present invention provides a new Passenger Bus Cargo Handling System construction wherein the same can be utilized for offering a top loading extendable and retractactable cargo handling system.

The general purpose of the present invention, which will be described subsequently in greater detail, is to provide a new Passenger Bus Cargo Handling System apparatus and method which has many of the advantages of the touring buses luggage compartments mentioned heretofore and many novel features that result in a new Passenger Bus is Cargo Handling System which is not anticipated, rendered obvious, suggested, or even implied by any of the prior art touring buses luggage compartments, either alone or in any combination thereof.

To attain this, the present invention generally comprises a support rail, a moveable tray, axle spindles, load carrying wheels, and a retaining latch.

There has thus been outlined, rather broadly, the more important features of the invention in order that the detailed description thereof that follows may be better understood, and in order that the present contribution to the art may be better appreciated. There are additional features of the invention that wilt be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Passenger Bus Cargo Handling System apparatus and method which has many of the advantages of the touring buses luggage compartments mentioned heretofore and many novel features that result in a new Passenger Bus Cargo Handling System which is not anticipated, rendered obvious, suggested, or even implied by any of the prior art touring buses luggage compartments, either alone or in any combination thereof.

It is another object of the present invention to provide a new Passenger Bus Cargo Handling System which may be easily and efficiently manufactured and marketed.

It is a further object of the present invention to provide a new Passenger Bus Cargo Handling System which is of a durable and reliable construction.

An even further object of the present invention is to provide a new Passenger Bus Cargo Handling System which is susceptible of a low cost of manufacture with regard to both materials and labor, and which accordingly is then susceptible of tow prices of sale to the consuming public, thereby making such Passenger Bus Cargo Handling System economically available to the buying public.

Still yet another object of the present invention is to provide a new Passenger Bus Cargo Handling System which provides in the apparatuses and methods of the prior art some of the advantages thereof, while simultaneously overcoming some of the disadvantages normally associated therewith.

Still another object of the present invention is to provide a new Passenger Bus Cargo Handling System for offering a top loading extendable and retractactable cargo handling system.

Yet another object of the present invention is to provide a new Passenger Bus Cargo Handling System which includes a support rail, a moveable tray, axle spindles, load carrying wheels, and a retaining latch.

Still yet another object of the present invention is to provide a new Passenger Bus Cargo Handling System that extends out of one side of a bus, receives luggage and other load, and retracts back into the bus.

Even still another object of the present invention is to provide a new Passenger Bus Cargo Handling System that defrays difficult bent over manuevering while loading luggage into a bus.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
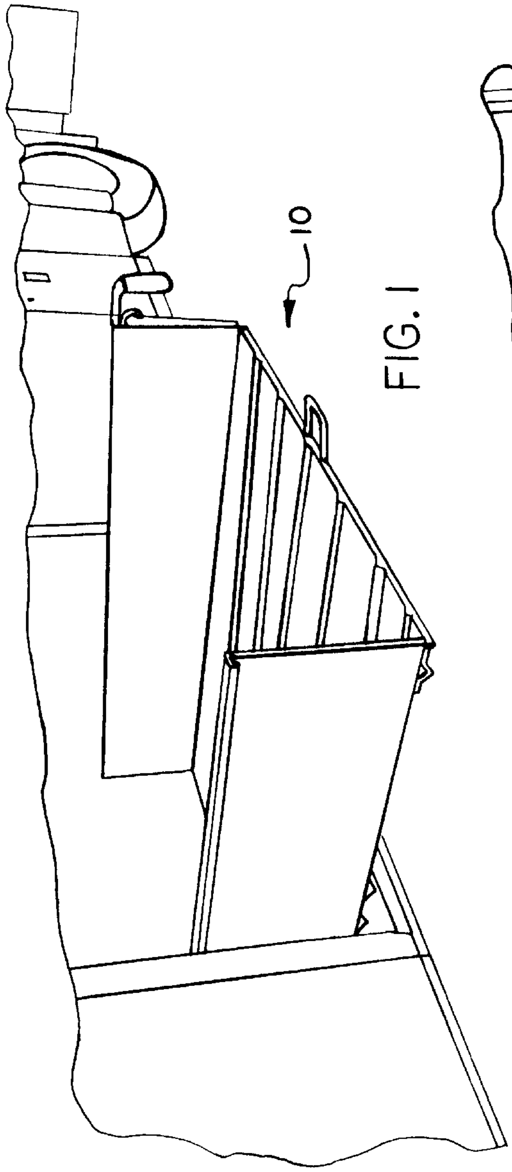
FIG. 1 is an outer right side perspective view of a new Passenger Bus Cargo Handling System installed into a bus according to the present invention.
Figure 2:
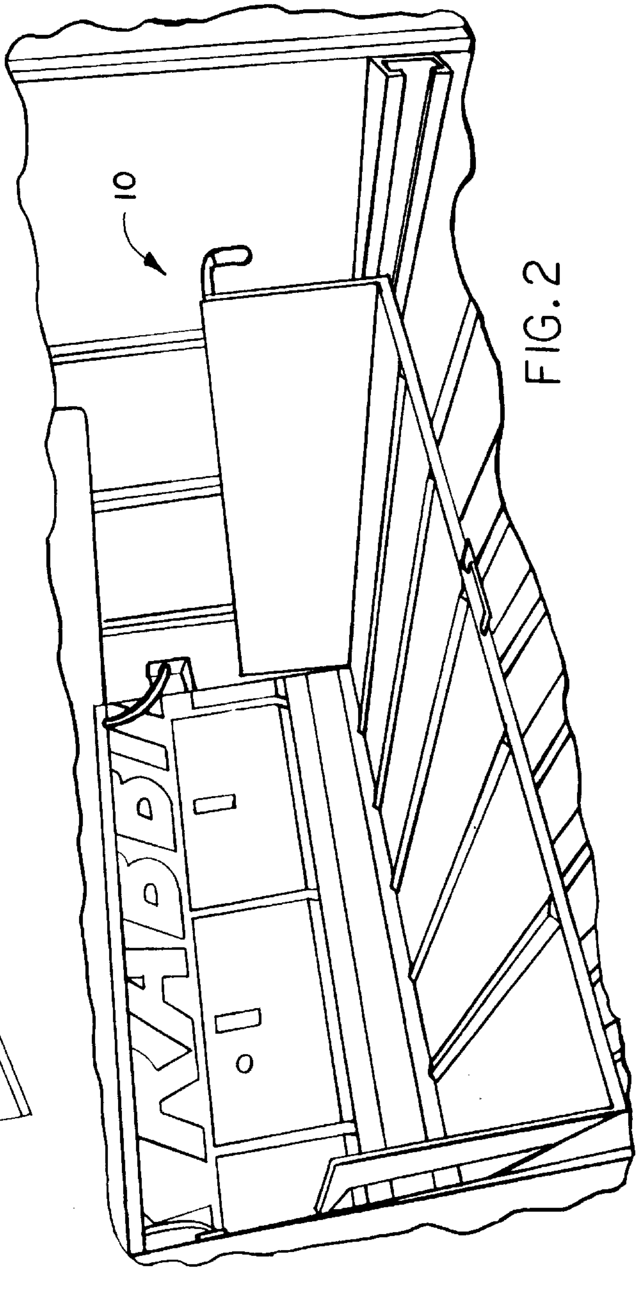
FIG. 2 is an inner rear end perspective view of a new Passenger Bus Cargo Handling System installed into a bus according to the present invention.

With reference now to the drawings, and in particular to FIGS. 1 through 7 thereof, a new Passenger Bus Cargo Handling System embodying the principles and concepts of the present invention and generally designated by the reference numeral to will be described.

More specifically, it will be noted that the Passenger Bus Cargo Handling System 10 comprises a support rail 20, a moveable tray 30, axle spindles 40, load carrying wheels 50, and a retaining latch 60 where the load carrying wheels 50 are rotatably attached to the axle spindles 40 which are fixedly attached to the moveable tray 30, and where the retaining latch 60 is operably attached to the moveable tray 30 and where the load carrying wheels 50 are matingly received within confines of the support rail 20 and therefore allow bi-directional traversing operation of the moveable tray 30 and where the retaining latch 60 is therefore used to selectively retain the moveable tray 30 in any desired degree of extension or retraction.

As best illustrated in FIGS. 1 through 6, it can be shown that the support rail 20 is further defined as an elongated tubular slotted channel 22 having a plurality of upper flange apertures 24, a detachable rail section 26, detachable rail section apertures 28, a vertical support wall 21, a top roller flange 23, a bottom roller flange 25, a downwardly extending retainer flange 27, and an upwardly extending retainer flange 29 where the detachable rail section 26 can be removably attached to the elongated tubular slotted channel 22 by use of the detachable rail section apertures 28 and a fastening means and where the top roller flange 23, and the bottom roller flange 25, are continuous integral orthogonal extensions of the vertical support wall 21, and where the downwardly extending retainer flange 27, is a continuous integral orthogonal extension of the top roller flange 23 and the upwardly extending retainer flange 29 is a continuous integral orthogonal extension of the bottom roller flange 25 and where the plurality of upper flange apertures 24 accommodate an attachment means for fixedly attaching the present invention to structural walls of a passenger bus cargo compartment.

Referring to FIG. 1 through 6, it can be shown that the moveable tray 30 is comprised of a bottom wall 32, and two side walls 34 each having an upper flange edge 38 and an outer flange edge 38 and where the two side walls 34 are upwardly turned orthogonal protrusions of the bottom wall 32 and where the upper flange edges 36 are outwardly turned orthogonal protrusions of the two side walls 34 and where the outer flange edges 38 are downwardly turned orthogonal protrusions of the upper flange edges 36.

The bottom wall 32 is further comprised of longitudinal stiffeners 31. The longitudinal stiffeners 31 are further defined as upwardly extending impressions formed into the bottom wall 32 and where each has a vertex 33 which joins together two equal legs 35 in a normal, perpendicular, or ninety degree angle.

The moveable tray 30 further includes a push-pull handle 39 which is fixedly attached to the moveable tray 30 and is functionally useful for the user to extend and retract the moveable tray 30.

Referring to FIG. 8, it can be shown that the axle spindles 40 extendedly protrude from each end of an axle assembly 41 and are attachedly fixed thereto and where the axle assembly 41 is further comprised of a formed elongated structural member having two downwardly extending lags 42 which are continuously adjoined at each of their upper ends to inwardly extending top walls 44 which in turn are continuously adjoined at each of their inner ends to angular downwardly extending crevice walls 46 that are continuously adjoined to each other and therefore form a perpendicular corner which matingly receives the axle spindle 40 which is further defined as an elongated cylindrical element.

Figure 4:
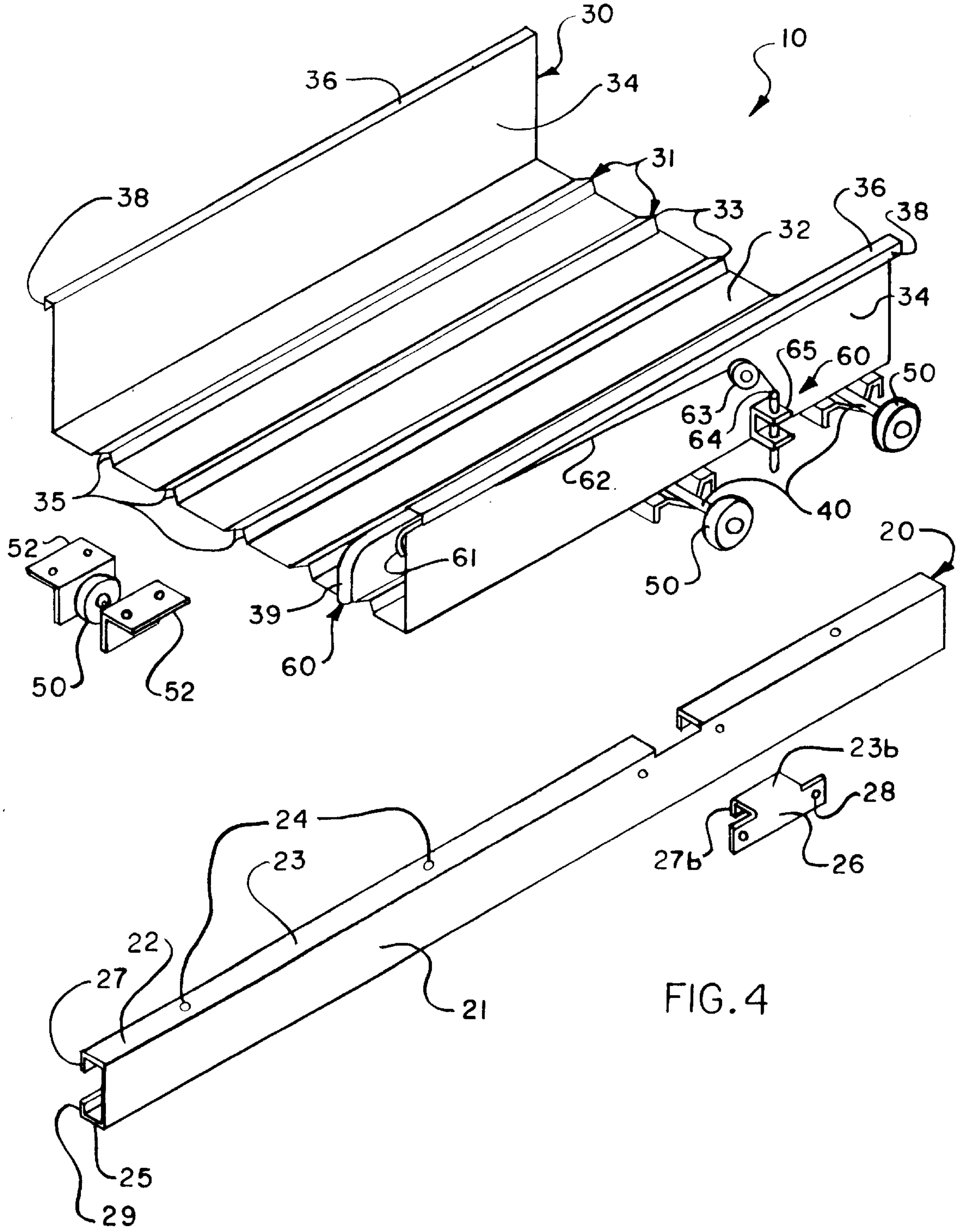
FIG. 4 is an exploded isometric illustration of the present invention.
Figure 6:
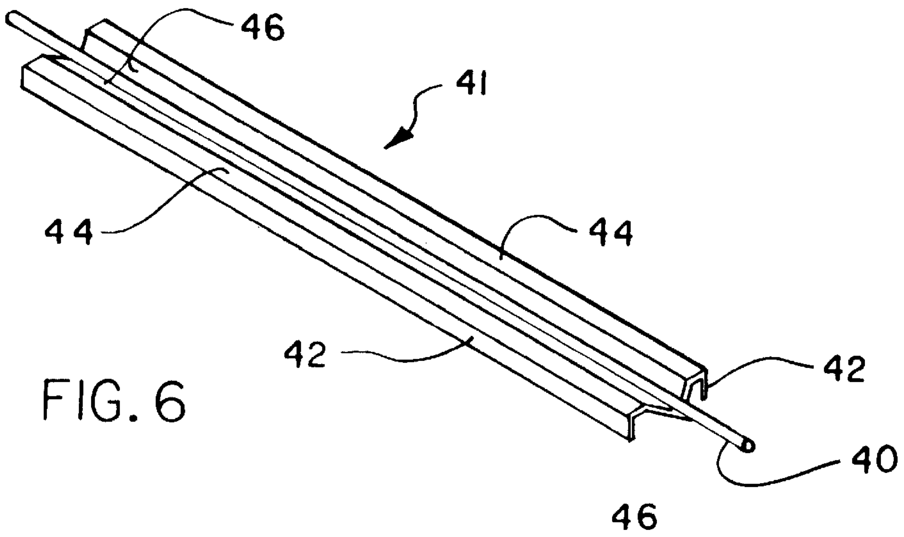
FIG. 6 is a bottom view isometric illustration of a segment of the rib structure of the present invention.
Figure 5:
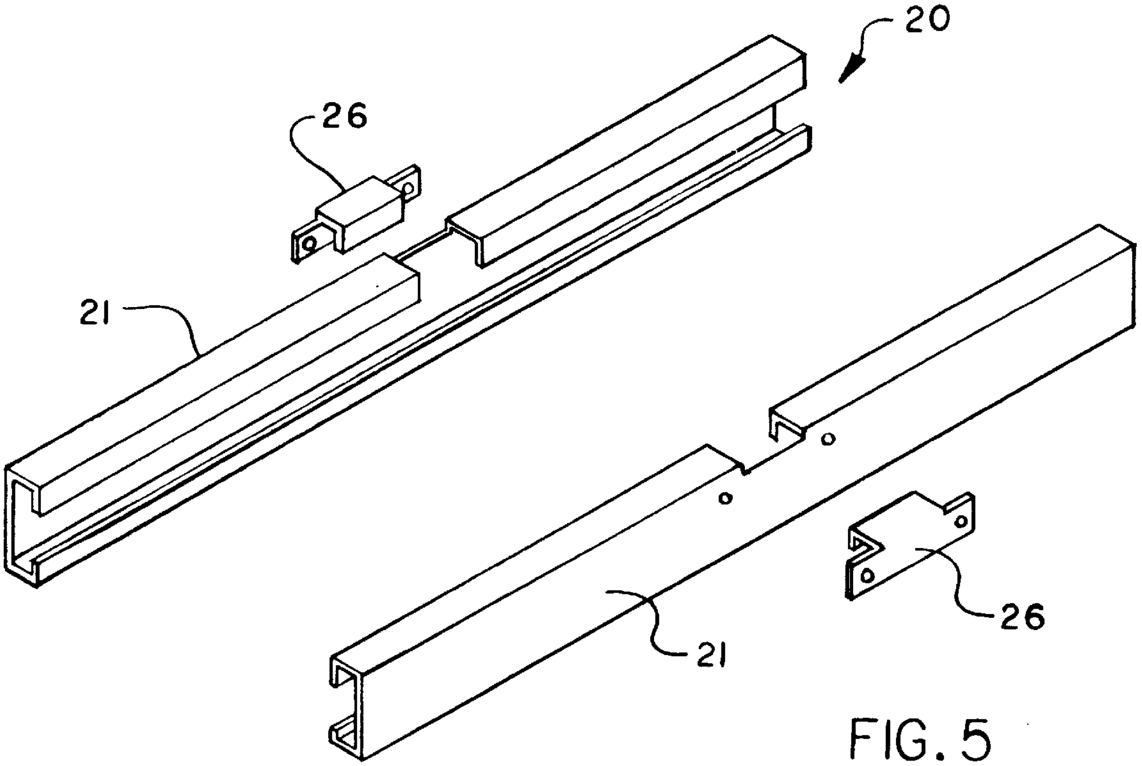
FIG. 5 is an exploded isometric illustration of the support rails of the present invention.

Referring to FIG. 4, it can be shown that the load carrying wheels 50 are rotatably fixed and axially retained to the axle spindle 40 and therefore, upon fixedly attaching the axle assembly 41 to the bottom wall 31, the axle spindle 40 is enclosed on at least three sides and the load carrying wheels 50, rotate while supporting most loads and therefore allow the moveable tray 30 to traversingly extend and retract.

Additionally, an alternate way to support some of the wheels 50 together with some of the axle spindles 40 are to employ shorter angle supports 52 which possess an axle spindle aperture for matingly receiving axle spindles and mounting apertures for fixed attachment to the underside of the moveable tray 30.

Figure 3:
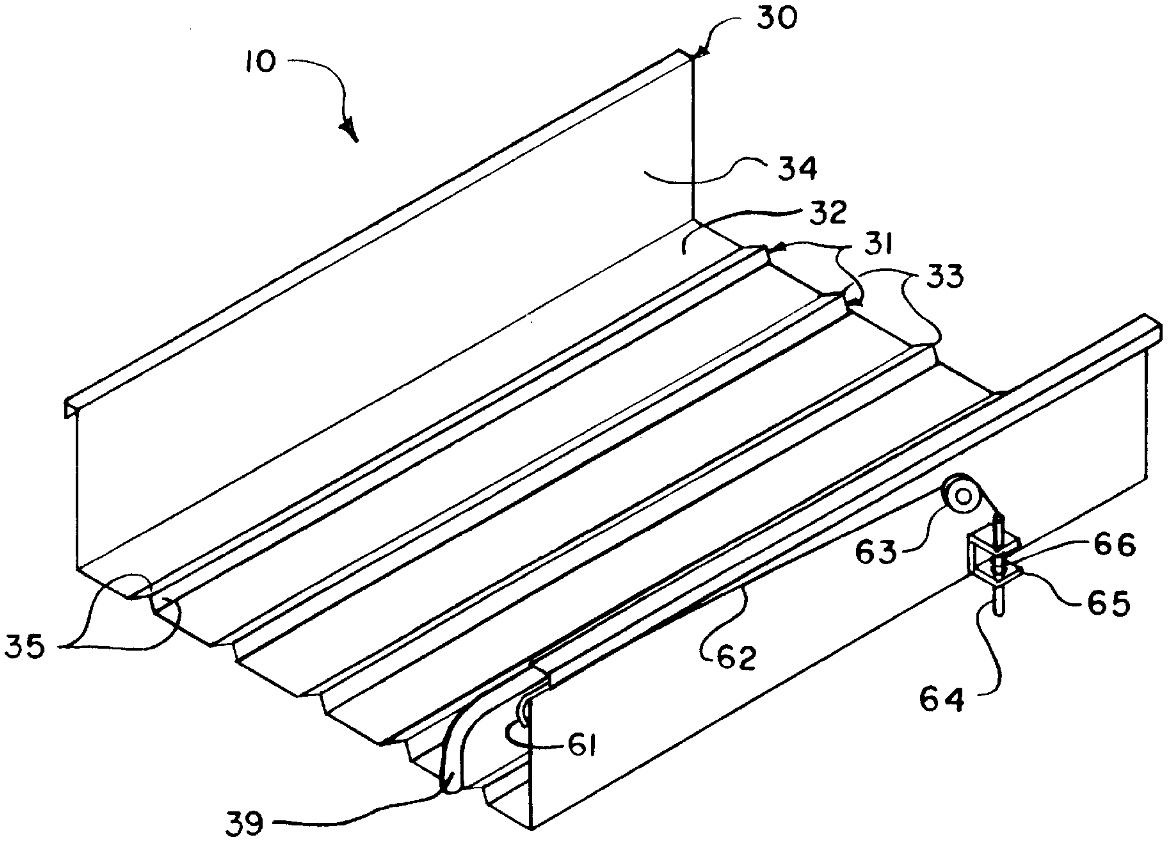
FIG. 3 is a perspective view of the present invention.

Referring to FIG. 3 and 4, it can be shown that the retaining latch 60 is comprised of a handle 61, a pull cable 62, a redirection pulley 63, a retainer pin 64, a mounting bracket 65, and a spring return means 66 where the handle 61 is fastened to one end of the pull cable 62 and the other end of the pull cable 62 is fastened to the retainer pin 64 and where the pull cable 62 is redirected by the redirection pulley 63 which is rotationally fastened to the moveable tray 30 and the retainer pin 84 is matingly, operably, and slideably received within retainer pin apertures which are formed into the mounting bracket 65 which is further defined as a u-shaped bracket having an upper flange and a tower flange joined together by a back wall and where the back wall is fixedly attached to the moveable tray 30 and the upper flange and the lower flange each include the retainer pin aperture and where the retainer pin apertures are axially concentric with each other and where the retainer pin 64 also protrudes through the spring return means 66 which is biasedly applied to cause the retainer pin 64 to normally extend protrudingly downward into mating cargo compartment apertures therefore retaining the moveable tray from traversing movement.

In use, a passenger bus is equipped with the present invention is and the user can more easily load cargo into the bus, saving back pain and other exasperating energies.

Figure 7:
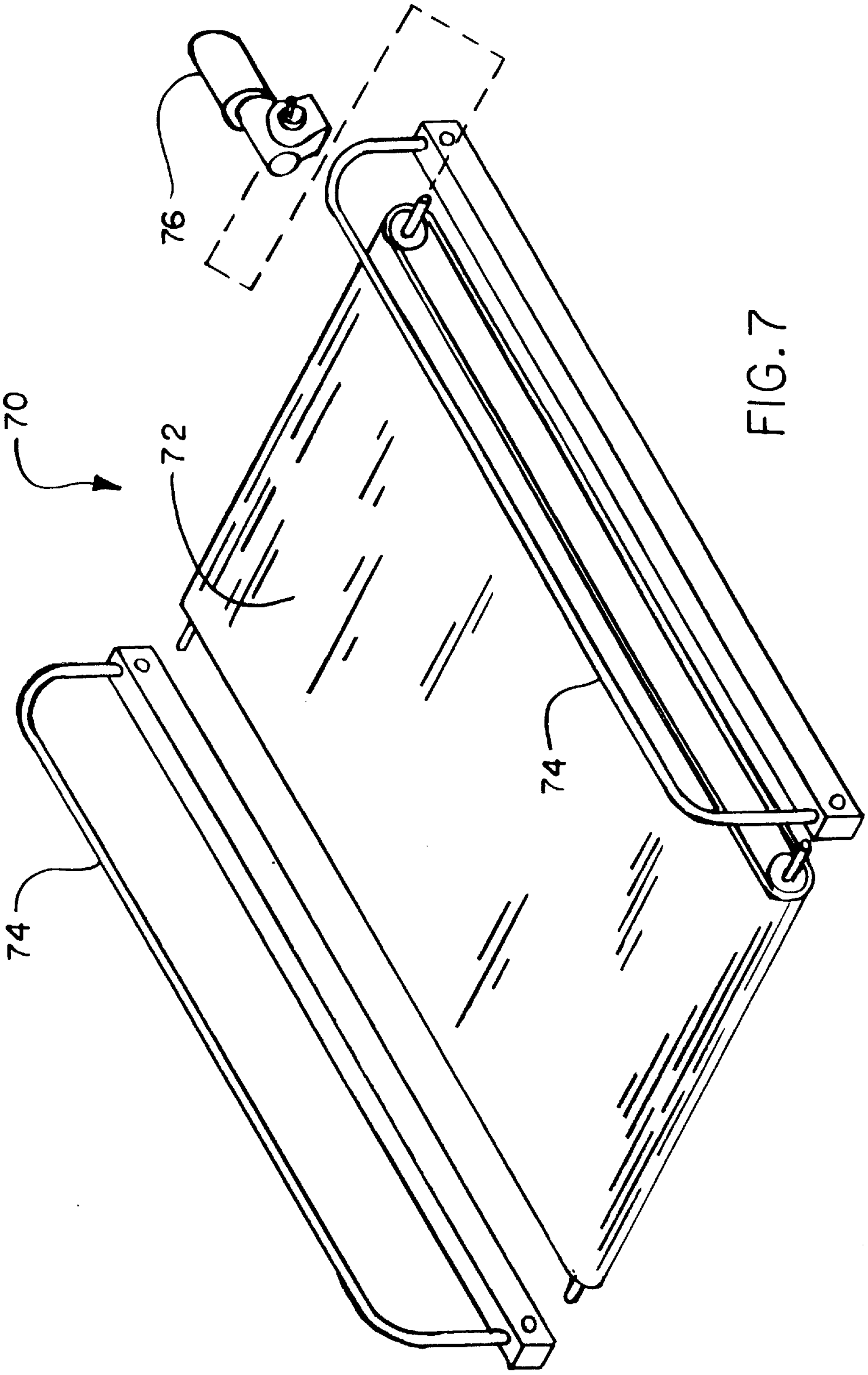
FIG. 7 is a right side perspective view of an alternate embodiment of a new Passenger Bus Cargo Handling System according to the present invention.

In an alternate embodiment, referring to FIG. 7, a motorized conveyor system 70 can be employed in such a way that cargo could be loaded from one location and the conveyor 72 used to transfer the cargo, back, deep into the cargo compartment. Hand rails 74 are utilized for maneuvering of the conveyor system while a motor 76 is used to impart motion to the system. Additionally, identifying labels can be utilized to organize the cargo and a computerized controller can be used to selectively return individual portions of cargo or selective groups of cargo back to the location of choice.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Index of Elements for Passenge Bus Cargo Handling System

| | |
|---|---|
| □ | UNNUMBERED ELEMENTS |
| □ | |
| □ | |
| □ | |
| □ | |
| □ | |
| □ | |
| □ | |
| □ | |
| □ | |
| □ | 10. Passenger Bus Cargo Handling System |
| □ | 11. |
| □ | 12. |
| □ | 13. |
| □ | 14. |
| □ | 15. |
| □ | 16. |
| □ | 17. |
| □ | 18. |
| □ | 19. |
| □ | 20. support rail |
| □ | 21. vertical support wall 21 |
| □ | 22. elongated tubular slotted channel |
| □ | 23. top roller flange 23 |
| □ | 24. upper flange apertures 24 |
| □ | 25. bottom roller flange 25 |
| □ | 26. detachable rail section 26 |
| □ | 27. downwardly extending retainer flange |
| □ | 28. detachable rail section apertures 28 |
| □ | 29. upwardly extending retainer flange 29 |
| □ | 30. moveable tray |
| □ | 31. |
| □ | 32. bottom wall 32 |
| □ | 33. |
| □ | 34. side walls 34 |
| □ | 35. |
| □ | 36. upper flange edge 36 |
| □ | 37. |
| □ | 38. outer flange edge 38 |
| □ | 39. push-pull handle 39 |
| □ | 40. axle spindles |
| □ | 41. axle assembly 41 |
| □ | 42. downwardly extending legs 42 |
| □ | 43. |
| □ | 44. inwardly extending top walls 44 |
| □ | 45. |
| □ | 46. angular downwardly extending crevice walls 46 |
| □ | 47. |
| □ | 48. |
| □ | 49. |
| □ | 50. load carrying wheels |
| □ | 51. |
| □ | 52. shorter angle supports 52 |
| □ | 53. |
| □ | 54. |
| □ | 55. |
| □ | 56. |
| □ | 57. |
| □ | 58. |
| □ | 59. |
| □ | 60. retaining latch |
| □ | 61. handle 61 |
| □ | 62. pull cable 62 |
| □ | 63. redirection pulley 63 |
| □ | 64. retainer pin 64 |
| □ | 65. mounting bracket 65 |
| □ | 66. spring return means 66 |
| □ | 67. |
| □ | 68. |
| □ | 69. |
| □ | 70. motorized conveyor system |
| □ | 71. |
| □ | 72. conveyor |
| □ | 73. |
| □ | 74. hand rail |
| □ | 75. |
| □ | 76. motor |
| □ | 77. |
| □ | 78. |
| □ | 79. |

What is claimed is:

1. A Passenger Bus Cargo Handling System comprising: a support rail, a moveable tray, axle spindles, load carrying wheels, and a retaining latch where the load carrying wheels are rotatably attached to the axle spindles which are fixedly attached to the moveable tray, and where the retaining latch is moveably attached to the moveable tray and where the load carrying wheels are matingly received within confines of the support rail and therefore allow bi-directional traversing operation of the moveable tray and where the retaining latch, when moved, is therefore engaged or disengaged and is thereby used to selectively retain the moveable tray in selected positions of extension or retraction and wherein the support rail is further defined as an elongated tubular slotted channel having a plurality of upper flange apertures, a detachable rail section, detachable rail section apertures, a vertical support wall, a top roller flange, a bottom roller flange, a downwardly extending retainer flange, and an upwardly extending retainer flange where the detachable rail section can be removably attached to the elongated tubular slotted channel by use of the detachable rail section apertures and a fastening means and where the top roller flange, and the bottom roller flange, are continuous integral orthogonal extensions of the vertical support wall, and where the downwardly extending retainer flange is a continuous integral orthogonal extension of the top roller flange and the upwardly extending retainer flange is a continuous integral orthogonal extension of the bottom roller flange and where the plurality of upper flange apertures accommodate an attachment means for fixedly attaching the passenger bus cargo handling system to structural walls of a passenger bus cargo compartment.

2. The Passenger Bus Cargo Handling System of claim 1, wherein the moveable tray is comprised of a bottom wall, and two side walls each having an upper flange edge and an outer flange edge and where the two side walls are upwardly turned orthogonal protrusions of the bottom wall and where the upper flange edges are outwardly turned orthogonal protrusions of the two side walls and where the outer flange edges are downwardly turned orthogonal protrusions of the upper flange edges.

3. The Passenger Bus Cargo Handling System of claim 2, wherein the bottom wail is further comprised of longitudinal stiffeners.

4. The Passenger Bus Cargo Handling System of claim 3, wherein the longitudinal stiffeners are further defined as upwardly extending impressions formed into the bottom wall and where each has a vertex which joins together two equal length legs in a perpendicular angle.

5. The Passenger Bus Cargo Handling System of claim 4, wherein the moveable tray further includes a push-pull handle which is fixedly attached to the moveable tray for extending and retracting the moveable tray.

6. The Passenger Bus Cargo Handling System of claim 5, wherein the axle spindles extendedly protrude from each end of an axle assembly and are attachedly fixed thereto and where the axle assembly is further comprised of a formed elongated structural member having two downwardly extending legs which are continuously adjoined at each of their upper ends to inwardly extending top walls which in turn are continuously adjoined at each of their inner ends to angular downwardly extending crevice walls that are continuously adjoined to each other and therefore form a perpendicular corner which matingly receives the axle spindle which is further defined as an elongated cylindrical element.

7. The Passenger Bus Cargo Handling System of claim 6, wherein the load carrying wheels are rotatably fixed and axially retained to the axle spindle and therefore, upon fixedly attaching the axle assembly to the bottom wall, the axle spindle is enclosed on at least three sides and the load carrying wheels, rotate while supporting loads and therefore allow the moveable tray to traversingly extend and retract.

8. The Passenger Bus Cargo Handling System of claim 6, wherein the wheels together with the axle spindles are supported by shorter angle supports which possess an axle spindle aperture for matingly receiving axle spindles and mounting apertures for fixed attachment to the underside of the moveable tray.

9. The Passenger Bus Cargo Handling System of claim 8, wherein the retaining latch is comprised of a handle, a pull cable, a redirection pulley, a retainer pin, a mounting bracket, and a spring return means where the handle is fastened to one end of the pull cable and the other end of the pull cable is fastened to the retainer pin and where the pull cable is redirected by the redirection pulley which is rotationally fastened to the moveable tray and the retainer pin is matingly, operably, and slideably received within retainer pin apertures which are formed into the mounting bracket which is further defined as a u-shaped bracket having an upper flange and a lower flange joined together by a back wall and where the back wall is fixedly attached to the moveable tray and the upper flange and the lower flange each include the retainer pin apertures and where the retainer pin apertures are axially concentric with each other and where the retainer pin also protrudes through the spring return means which is biasedly applied to cause the retainer pin to normally extend protrudingly downward into mating cargo compartment apertures therefore retaining the moveable tray from traversing movement.

10. A Passenger Bus Cargo handling System comprising: a support rail, a moveable tray, axle spindles, load carrying wheels, and a retaining latch where the load carrying wheels are rotatably attached to the axle spindles which are fixedly attached to the moveable tray, and where the retaining latch is operably attached to the moveable tray and where the load carrying wheels are matingly received within confines of the support rail and therefore allow bi-directional traversing operation of the moveable tray and where the retaining latch is therefore used to selectively retain the moveable tray in any desired degree of extension or retraction wherein the support rail is further defined as an elongated tubular slotted channel having a plurality of upper flange apertures, a detachable rail section, detachable rail section apertures, a vertical support wall, a top roller flange, a bottom roller flange, a downwardly extending retainer flange, and an upwardly extending retainer flange where the detachable rail section can be removably attached to the elongated tubular slotted channel by use of the detachable rail section apertures and a fastening means and where the top roller flange, and the bottom roller flange, are continuous integral orthogonal extensions of the vertical support wall, and where the downwardly extending retainer flange is a continuous integral orthogonal extension of the top roller flange and the upwardly extending retainer flange is a continuous integral orthogonal extension of the bottom roller flange and where the plurality of upper flange apertures accommodate an attachment means for fixedly attaching the passenger bus cargo handling system to structural walls of a passenger bus cargo compartment.

11. The Passenger Bus Cargo Handling System of claim 10, wherein the moveable tray is comprised of a bottom wall, and two side walls each having an upper flange edge and an outer flange edge and where the two aide walls are upwardly turned orthogonal protrusions of the bottom wall and where the upper flange edges are outwardly turned orthogonal protrusions of the two side walls and where the outer flange edges are downwardly turned orthogonal protrusions of the upper flange edges.

12. The Passenger Bus Cargo Handling System of claim 11, wherein the bottom wall is further comprised of longitudinal stiffeners.

13. The Passenger Bus Cargo Handling System of claim 12, wherein the longitudinal stiffeners are further defined as upwardly extending impressions formed into the bottom wall and where each has a vertex which joins together two equal length legs in a ninety degree angle.

14. The Passenger Bus Cargo Handling System of claim 13, wherein the moveable tray further includes a push-pull handle which is fixedly attached to the moveable tray for extending and retracting the moveable tray.

15. The Passenger Bus Cargo Handling System of claim 14, wherein the axle spindles extendedly protrude from each end of an axle assembly and are attachedly fixed thereto and where the axle assembly is further comprised of a formed elongated structural member having two downwardly extending legs which are continuously adjoined at each of their upper ends to inwardly extending top walls which in turn are continuously adjoined at each of their inner ends to angular downwardly extending crevice walls that are continuously adjoined to each other and therefore form a perpendicular corner which matingly receives the axis spindle which is further defined as an elongated cylindrical element.

16. The Passenger Bus Cargo Handling System of claim 15, wherein the load carrying wheels are rotatably fixed and axially retained to the axle spindle and therefore, upon fixedly attaching the axle assembly to the bottom wall, the axle spindle is enclosed on at least three sides and the load carrying wheels rotate while supporting loads and therefore allow the moveable tray to traversingly extend and retract.

17. The Passenger Bus Cargo Handling System of claim 16, wherein the wheels together with some of the axle spindles are supported by shorter angle supports which possess an axle spindle aperture for matingly receiving axle spindles and mounting apertures for fixed attachment to the underside of the moveable tray.

18. The Passenger Bus Cargo Handling System of claim 17, wherein the retaining latch is comprised of a handle, a pull cable, a redirection pulley, a retainer pin, a mounting bracket, and a spring return means where the handle is fastened to one and of the pull cable and the other end of the pull cable is fastened to the retainer pin and where the pull cable is redirected by the redirection pulley which is rotationally fastened to the moveable tray and the retainer pin is matingly, operably, and slideably received within retainer pin apertures which are formed into the mounting bracket which is further defined as a u-shaped bracket having an upper flange and a lower flange joined together by a back wall and where the back wall is fixedly attached to the moveable tray and the upper flange and the lower flange each include the retainer pin apertures and where the retainer pin apertures are axially concentric with each other and where the retainer pin also protrudes through the spring return means which is biasedly applied to protrudes through the spring return means which is biasedly applied to cause the retainer pin to normally extend protrudingly downward into mating cargo compartment apertures therefore retaining the moveable tray from traversing movement.

* * * * *